United States Patent [19]

Tanaka et al.

[11] Patent Number: 4,574,736
[45] Date of Patent: Mar. 11, 1986

[54] MILKING APPARATUS

[75] Inventors: Tadaaki Tanaka, Tokorozawa; Tadahiro Ibuki; Yoshiaki Nakamura, both of Sayama; Masaichi Yamamoto, Tokyo, all of Japan

[73] Assignee: Eisai Co., Ltd, Tokyo, Japan

[21] Appl. No.: 652,795

[22] Filed: Sep. 20, 1984

[30] Foreign Application Priority Data

Sep. 26, 1983 [JP] Japan .................................. 58-178945

[51] Int. Cl.$^4$ ................................................ A01J 5/14
[52] U.S. Cl. ................................ 119/14.08; 119/14.14
[58] Field of Search ............................ 119/14.08, 14.14

[56] References Cited

U.S. PATENT DOCUMENTS 3,878,819  4/1975  Harman ........................ 119/14.08
4,011,838  3/1979  Nordegren et al. ............. 119/14.08
4,344,385  8/1982  Swanson et al. ................ 119/14.08
4,403,568  9/1983  Fukuhara et al. .............. 119/14.14

Primary Examiner—Hugh R. Chamblee
Attorney, Agent, or Firm—Fulbright & Jaworski

[57] ABSTRACT

A milking apparatus comprises sets of electrodes for detecting milk flows sucked by individual teat cups capped on individual teats, tubes connected to pressure chambers of the respective teat cups, change-over valves operative to supply atmospheric pressure and vacuum periodically and alternately to the tubes, counters for counting times for non-detection of the milk flows by the sets of electrodes, and controller for actuating the change-over valves to supply only atmospheric pressure to the tubes when the counted times of the counters exceed a predetermined time.

4 Claims, 11 Drawing Figures

MILKING APPARATUS

BACKGROUND OF THE INVENTION

This invention relates to milking apparatus and more particularly to a milking apparatus of the type utilizing teat cups.

Milking operations in dairy farming have been advanced from milking by hand to efficient milking with bucket milkers and then rapidly automated with the use of more efficient pipeline milkers. It follows therefore that one operator can handle to milk about 20 milch cows to improve the yield of milk but, on the other hand, disease of mastitis has been rapidly increased. This inconvenience is considered to be attributable to excessive seeking of efficiency which leads to failure to carefully manage individual cows. Especially, adverse affect of excessive milking is serious and devices for preventing excessive milking have been proposed.

One device to this end uses a flow meter inserted in a milk feeding pipe to raise vacuum degree and change the number of pulsations when the milk flow is decreased, so that stimulus to the teat can be mitigated. This device has succeeded in relieving appreciable anxiety about excessive milking by the milker but fails to discriminate completion of milking of any one of four teats because the flow rate of the sum of milk flows from the four teats is measured, with the result that some of the teats are sucked excessively. In addition, this device has a complicated construction and is increased in weight, thus impairing portability.

According to another proposed device, a vacuum circuit is closed when the milk flow is stopped to thereby remove the teat cup from the teat automatically. To prevent inadvertent dropping of the teat cup to the floor, however, this device disadvantageously requires a sophisticated unit for supporting the teat cup. Further, it happens that the teat cup may automatically be removed from the teat even when a large amount of milk still remain in the udder. Consequently, milk flow halt can not always coincide with the completion of milking, making it difficult to obtain matching therebetween.

SUMMARY OF THE INVENTION

This invention contemplates elimination of the disadvantages of the conventional milking devices and has for its object to provide a milking apparatus which can automatically check dry-up of milk for each teat to halt sucking of a teat cup capped on a teat identified as dried-up one and can maintain adherence of that teat cup to the teat for a predetermined time, whereby perfect milking can be effected for each teat and excessive milking can be prohibited to prevent disease of mastitis, and dropping of the individual teat cups from the teats upon halt of milking thereby unnecessitating any conventional sophisticated support unit for supporting the teat cups removed from the teats.

To accomplish the above object, according to this invention, there is provided a milking apparatus comprising sets of electrodes for detecting milk flows sucked by individual teat cups, pressure transmitting tubes for transmitting air pressure to pressure chambers of the respective teat cups, air pressure means responsive to actuation of change-over valve means to supply atmospheric pressure and vacuum periodically and alternately to the transmitting tubes, counting means for counting times for non-detection of the milk flows by the sets of electrodes, and control means for actuating the change-over valve means to supply only atmospheric pressure to the transmitting tubes when the counted times of the counting means exceed a predetermined time.

Another object of this invention is to provide a milking apparatus which can automatically be operated accurately responsive to changes in milking time due to changes in kind and physiological condition of milch cows and ambient condition during milking, thereby eliminating remainder of milk in the udder after sucking without resort to labor of the operator.

This object can be accomplished by an embodiment of this invention wherein the change-over valve means responsive to the air pressure means comprises a valve body disposed between the transmitting tube and an atmosphere passage as well as a vacuum passage, and a solenoid for selectively moving the valve body to either an atmosphere position through which the transmitting tube is in communication with the atmosphere passage or a vacuum position through which the transmitting tube is in communication with the vacuum passage, and the control means comprises a counting circuit responsive to an "absence of milk" signal from the electrodes to count a duration time of the "absence of milk" signal and deliver an output signal representative of counted time, and a dispatching circuit responsive to the output signal of the counting circuit to compare a received signal with a predetermined time and deliver a halt signal to the solenoid when the received signal coincides with the predetermined time, whereby the solenoid causes the valve body to halt at the atmosphere position by receiving the halt signal. Generally, a permissible milking time for a milch cow is 5 to 6 minutes but it slightly varies with kind and physiological condition of the milch cow. If the cow is in astonishment during milking, the milk flow will be halted. In addition, as milking comes to an end, the milk flow is liable to become intermittent.

Accordingly, if, in response to one detection of halt of milk change by the electrodes, the pulsating valve is immediately changed over to end milking, the remainder of milk after sucking will remain in the udder. In accordance with this embodiment of the present invention, after the detection of halt of the milk flow charge, the duration of the "absence of milk" signal is counted, the change-over signal for the pulsating valve is delivered after expiration of the predetermined time for the "absence of milk" signal, and when the milk flow is restarted prior to lapse of the predetermined time, the counting operation is released to initialize the counting and to permit the counting to repeat from the next halt of the milk flow charge, and the pulsating valve is changed over by the dispatching output to maintain the pressure chamber of the teat cup at atmospheric pressure, whereby the teat cup can be kept adhered to the udder automatically without resort to labor of the operator, thereby ensuring that milking can be ended safely.

BRIEF DESCRIPTION OF THE DRAWINGS

In the accompanying drawings

DETAILED DESCRIPTION OF THE INVENTION

Figure 1:
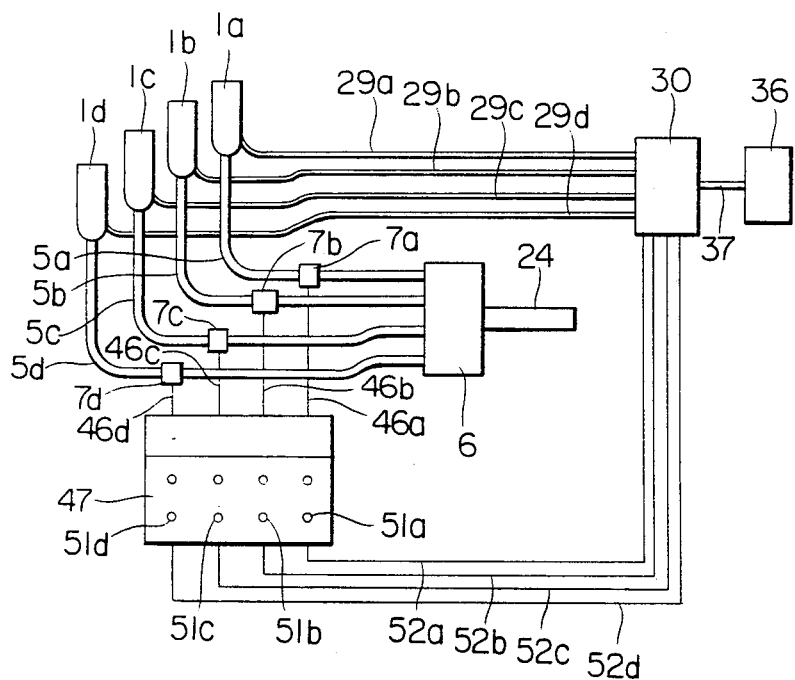
FIG. 1 is a schematic view of a first embodiment of a milking apparatus according to the invention.
Figure 2:
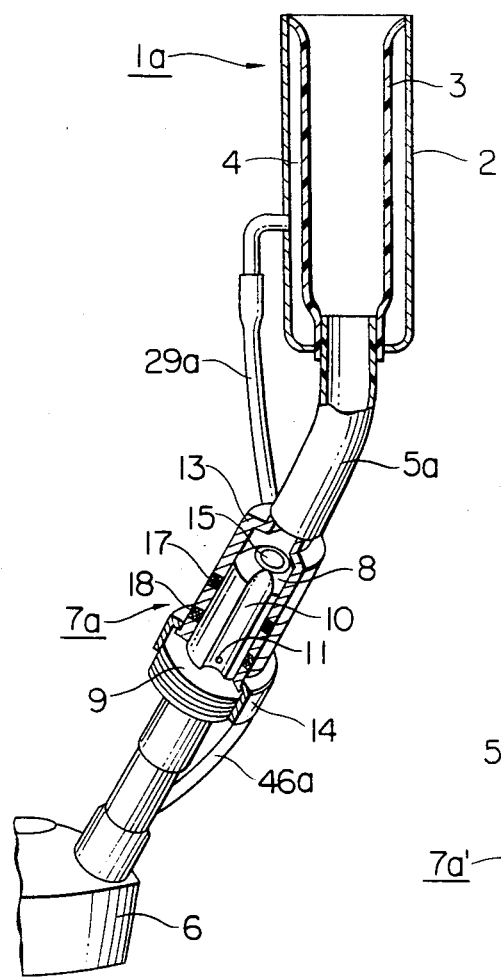
FIG. 2 is a perspective view, partly exploded, of a set of a teat cup, a milk feeding pipe, a trap and part of a milk-claw used for the embodiment of FIG. 1.

Referring now to FIGS. 1 to 7, a preferred embodiment of a milking apparatus according to the present invention will be described. Teat cups $1a$, $1b$, $1c$ and $1d$ to be capped on teats of a milch cow have the same construction, and one teat cup $1a$ will be described of its construction in the following description. As best seen in FIG. 2, the teat cup $1a$ has a cup body 2 made of stainless steel in which a liner 3 of a flexible and impermeable material is arranged to form a pressure chamber 4 between the cup body 2 and liner 3.

Returning to FIG. 1, milk feeding pipes $5a$, $5b$, $5c$ and $5d$ are connected, at one end, to the liners 3 of the teat cups $1a$, $1b$, $1c$ and $1d$, respectively, and connected, at the other end, to a milk-claw 6 through intervening traps $7a$, $7b$, $7c$ and $7d$.

Figure 3:
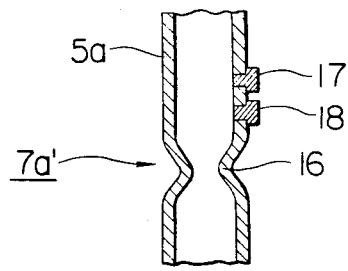
FIG. 3 is a sectional view showing a modified trap.

The traps $7a$, $7b$, $7c$ and $7d$ have the same construction and one trap $7a$ will be described of its construction. The trap $7a$ may be embodied in two forms of which one is shown at $7a$ in FIG. 2 and the other at $7a'$ in FIG. 3. The trap $7a$ includes a pipe-like trap body 8 having a flange 9 with threaded portion. Formed in the side wall of the trap body 8 is a longitudinal bypass passage 10 in the form of a groove. Formed in the peripheral wall of the trap body 8 and at a downstream portion of the passage 10 is a small hole 11 through which the bypass passage 10 is in communication with a center passage 15. The trap body 8 is inserted in an outer pipe 13 through which the body 8 communicates with the milk feeding pipe $5a$. The outer pipe 13 is coupled with the body 8 by means of a coupling 14 which is screwed on the flange 9, and a pair of electrodes 17 and 18 are embedded in the wall of the outer pipe 13 to expose to the inner peripheral surface thereof. A trap $7a'$ as shown in FIG. 3 has a construction extremely simplified as compared to that of the trap $7a$. More particularly, the milk feeding pipe $5a$ is partly narrowed to form a small diameter portion 16 and electrodes 17 and 18, similar to those of the trap $7a$, are embedded in the wall of the pipe $5a$ upstream of the small diameter portion 16, thus completing the trap $7a'$.

The electrodes 17 and 18 of the traps $7a$ and $7a'$ are made of a hygienically inoxious, electrically conductive material such as platinum, stainless steel or carbon. When these electrodes are wetted with milk, a predetermined amount of current is passed through the electrodes so that the presence or absence of the milk can be detected by making use of its conductivity.

Figure 4:
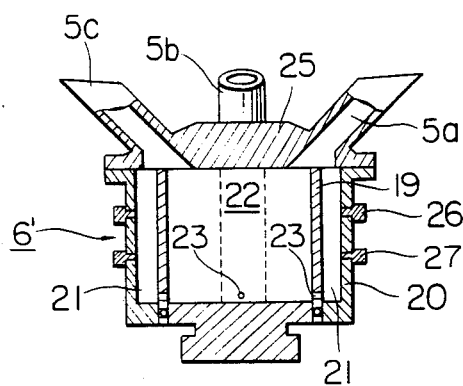
FIG. 4 is a longitudinal sectional view showing a milk-claw used for the milking apparatus according to the invention.
Figure 5:
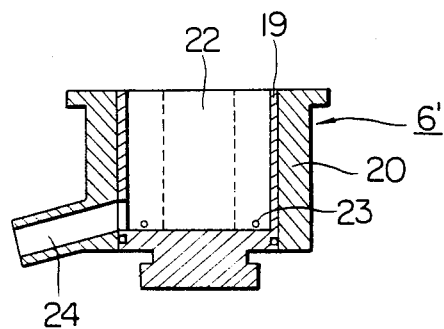
FIG. 5 is a sectional view of the milk-claw differently sectioned from FIG. 4.

FIGS. 4 and 5 illustrates a milk-claw $6'$ of the type provided with electrodes, which milk-claw is disclosed in detail in U.S. Pat. No. 4,403,568 filed on Dec. 17, 1981 and will be described briefly herein. The interior of a cylindrical body 20 of the milk-claw $6'$ is partitioned by partition walls 19 to form a collecting chamber 22 for milk and four inspection chambers 21 for milk established exteriorly of the collecting chamber, and a transfer pipe 24 communicating with the chamber 22 is secured to the body 20 between a pair of adjacent chambers 21. The milk feeding pipes $5a$, $5b$, $5c$ and $5d$ ($5d$ is not illustrated in FIG. 4) connected to a cover 25 are in communication with the chambers 21 and 22, and the inspection chambers 21 and the collecting chamber 22 are in communication with each other through small holes 23. Electrodes 26 and 27, similar to those described previously, are embedded in the outer peripheral wall of the chambers 21. With the provision of these electrodes 26 and 27, the electrodes 17 and 18 of the traps $7a$ and $7a'$ may be dispensed with. The transfer pipe 24 is connected to a suction unit not shown.

Turning to FIG. 1, pressure transmitting tubes $29a$, $29b$, $29c$ and $29d$ are connected, at one end, to the corresponding pressure chambers 4 of the teat cups $1a$, $1b$, $1c$ and $1d$ and, at the other end, to an air pressure means 30. As illustrated in detail in FIG. 6, the air pressure means 30 has a housing 31 the interior of which is divided by a partition wall 32 into a vacuum chamber 33 and a change-over chamber section which is further divided by partition walls 34 into four change-over chambers $35a$, $35b$, $35c$ and $35d$. The vacuum chamber 33 is in communication with a suction pipe 37 connected to a vacuum source 36 (FIG. 1), and the partition wall 32 is formed with suction holes $38a$, $38b$, $38c$ and $38d$ through which the respective change-over chambers $35a$, $35b$, $35c$ and $35d$ communicate with the vacuum chamber 33. The respective change-over chambers $35a$, $35b$, $35c$ and $35d$ have corresponding air pressure transfer pipes $39a$, $39b$, $39c$ and $39d$ respectively connected to the pressure transmitting tubes $29a$, $29b$, $29c$ and $29d$, and corresponding atmosphere passages $40a$, $40b$, $40c$ and $40d$ which are opened to atmospheric pressure. The atmosphere passages oppose the suction holes.

Change-over valve means disposed inside the change-over chambers have the same construction. The change-over valve means comprises a valve body $42a$, $42b$, $42c$ or $42d$ movable axially between the suction hole and the atmosphere hole so as to close either suction hole or atmosphere hole, a spring $43a$, $43b$, $43c$ or $43d$ adapted to normally urge the corresponding valve body upwardly in FIG. 6, and a solenoid $44a$, $44b$, $44c$ or $44d$ energizable to move the associated valve body downwardly in opposition to biasing force of the spring.

Figure 7:
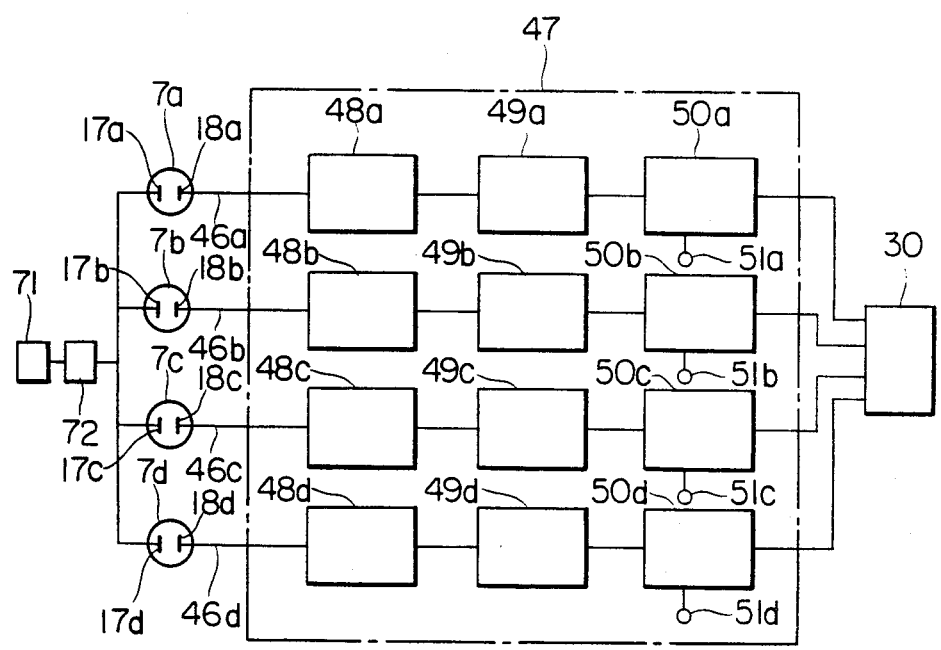
FIG. 7 is a block diagram showing details of a control means used for the FIG. 1 embodiment.

As shown in FIG. 7, the traps $7a$, $7b$, $7c$ and $7d$ have each a set of electrodes $17a$ and $18a$, a set of electrodes $17b$ and $18b$, a set of electrodes $17c$ and $18c$, and a set of electrodes $17d$ and $18d$, and one electrode $18a$, $18b$, $18c$ or $18d$ of each set is connected in series with a control means 47 through a line $46a$, $46b$, $46c$ or $46d$. Although not shown, the electrodes 26 and 27, in place of the electrodes 17 and 18, may be placed in a similar connection when the milk-claw 6' with the electrodes 26 and 27 is used in place of the trap. The other electrode 17a, 17b, 17c or 17d of each set is connected to the output of a buffer amplifier 72, as in an inspection unit to be described later with reference to FIG. 10. The input of the amplifier 72 is connected to the output of a sine wave generating circuit 71.

Detailes of the control means 47 are shown in FIG. 7. Milk sensing circuits 48a, 48b, 48c and 48d are connected to the corresponding sets of electrodes 18a, 18b, 18c and 18d to receive therefrom signals representative of presence or absence of milk on the basis of its conductivity and produce amplified signals. Counter circuits 49a, 49b, 49c and 49d are connected to the corresponding sensing circuits 48a, 48b, 48c and 48d to receive therefrom signals, for counting duration times of the received signals when these signals are indicative of "absence of milk", thereby producing resulting "counts". Dispatching circuits 50a, 50b, 50c and 50d are responsive to the output signals of the counter circuits 49a, 49b, 49c and 49d to compare counted times with a signal representative of a predetermined time. When the counted times coincide with the predetermined time, the dispatching circuits produce "halt signals" which are sent through lines 52a, 52b, 52c and 52d to the solenoids 44a, 44b, 44c and 44d of the air pressure means 30 to deenergize these solenoids. If milk is again charged before the input signal representative of the counted time reaches the predetermined time and hence the signal indicative of "absence of milk" is interrupted, then the dispatching circuit will stop comparing and will reset all the associated circuits to their initial states.

When milking a cow with the milking apparatus having the construction set forth above, the teats are inserted into the liners 3 and the apparatus is started to operate.

Figure 6:
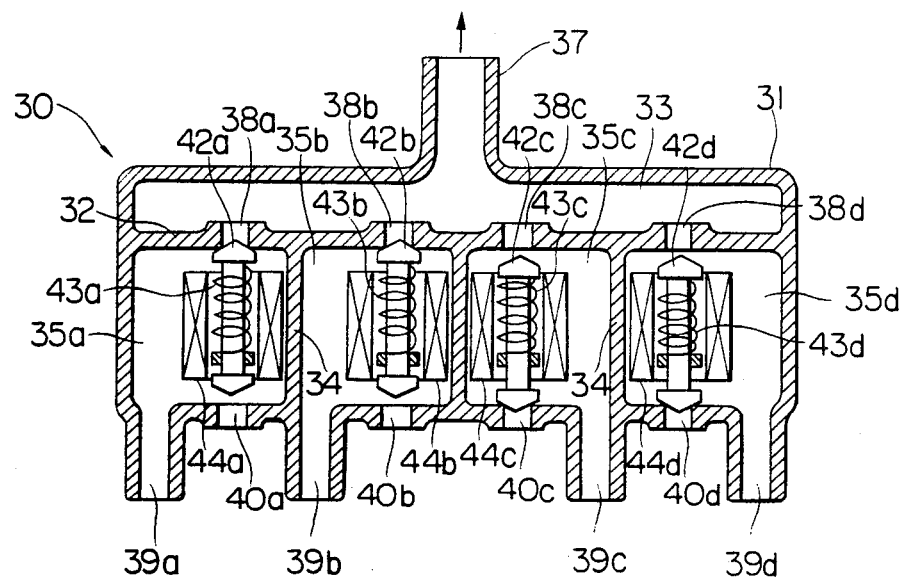
FIG. 6 is a longitudinally sectional front view of an air pressure change-over means used for the FIG. 1 embodiment, with lefthand two valve bodies being at atmosphere position and righthand two valve bodies being at vacuum position.

In the air pressure means 30, the solenoids 44c and 44d, for example, are energized to move the valve bodies 42c and 42d in opposition to biasing force of the springs 43c and 43d, as shown in FIG. 6. As a result, the atmosphere passages 40c and 40d are closed to shut out atmospheric pressure and at the same time, the suction holes 38c and 38d are opened to bring the pressure chambers 4 of the teat cups 1c and 1d into communication with the vacuum source 36 for evacuation of the pressure chambers. After 1 to 2 seconds have elapsed, the solenoids 44c and 44d are deenergized. Consequently, like the remaining valve bodies 42a and 42b shown in FIG. 6, the valve bodies 42c and 42d are urged upwardly by the springs 43c and 43d to close the suction holes 38c and 38d and open the atmosphere passages 40c and 40d so as to bring the pressure chambers 4 of the teat cups 1c and 1d into communication with atmospheric pressure for pressurizing the pressure chambers 4. The energization and deenergization of the solenoids 44c and 44d is cyclically repeated. Similarly, the remaining solenoids 44a and 44b and energized and deenergized cyclically. Then, the cyclic energization and deenergization operations of the solenoids 44a and 44b and the solenoids 44c and 44d are repeated alternately.

The milk feeding pipes 5a, 5b, 5c and 5d connected to the liners 3, on the other hand, are suctioned by the suction unit (not shown) through the transfer pipe 24. This suctioning and pulsation of the liner 3 due to the periodic exchange of atmospheric pressure and vacuum within the pressure chamber 4 cause the liner 3 to suck up the teat and concurrently, permit milking.

In apparatus with the traps 7a, 7b, 7c and 7d, the thus sucked milk partly, for the most part, flows past the center passage 15 and partly flows past the bypass passage 10 (FIG. 2) to reach the milk-claw 6. A portion of the milk passing by the bypass passage 10 is restricted by the small hole 11 and reduced in its flow velocity to temporarily stagnate there, whereby conductivity of the milk is detected by the electrodes 17 and 18.

In this manner, the milk is detected by the electrodes 17 and 18 or 26 and 27 and resulting signals are fed to the milk sensing circuits 48a, 48b, 48c and 48d. But, when the milk charge is halted and the electrodes 17 and 18 or 26 and 27 stop detecting the milk, some or all of the sensing circuits 48a, 48b, 48c and 48d deliver signals indicative of "absence of milk" corresponding to a value of conductivity of the milk which is less than a predetermined level. The counter circuits 49a, 49b, 49c and 49d respond to the "absence of milk" signals and counts duration times of these signals to produce resulting counts. The counted times are compared with a predetermined time (typically, 20 to 30 seconds) at the dispatching circuits 50a, 50b, 50c and 50d. When the counted times coincide with or exceed the predetermined time, some or all of the dispatching circuits 50a, 50b, 50c and 50d deliver halt signals which in turn are fed to the corresponding solenoids 44a, 44b, 44c and 44d.

When supplied with the halt signals, the solenoids 44a, 44b, 44c and 44d are deenergized to open the corresponding atmosphere passages 40a, 40b, 40c and 40d to allow the pressure chambers 4 of the corresponding teat cups 1a, 1b, 1c and 1d to communicate with atmospheric pressure, and the application of pulsation to the corresponding teats is halted to stop milking. However, vacuum still prevails in the liners, the teat cups 1a, 1b, 1c and 1d remain adhered to the teats. Some or all of the dispatching circuits 50a, 50b, 50c and 50d deliver the halt signals together with simultaneous resetting of the corresponding associated circuits.

Assume now that the milk charge from a teat is temporarily halted accidentally, followed by the delivery of the "absence of milk" signal from the electrodes 17 and 18 or 26 and 27 to the sensing circuit corresponding to the teat. If, in such an event, the charging of milk restarts within the predetermined time set for the dispatching circuit and the electrodes 17 and 18 or 26 and 27 restart to deliver the signal indicative of the presence of milk to the sensing circuit, then the dispatching circuit corresponding to the teat will not deliver the halt signal and one of the counter circuits 49a to 49d corresponding to the teat will be reset to its initial state. Accordingly, the corresponding counter circuit will restart counting as soon as it again receives a halt signal.

When milking from all the teat cups 1a, 1b, 1c and 1d has been perfected in this manner, the operation of the apparatus is stopped and the teat cups are removed from the teats. Preferably, the dispatching circuits 50a, 50b, 50c and 50d may be connected with signal lamps 51a, 51b, 51c and 51d as shown in FIG. 7 or with signal horns not shown for signalling the removal of the teat cup.

Figure 8:
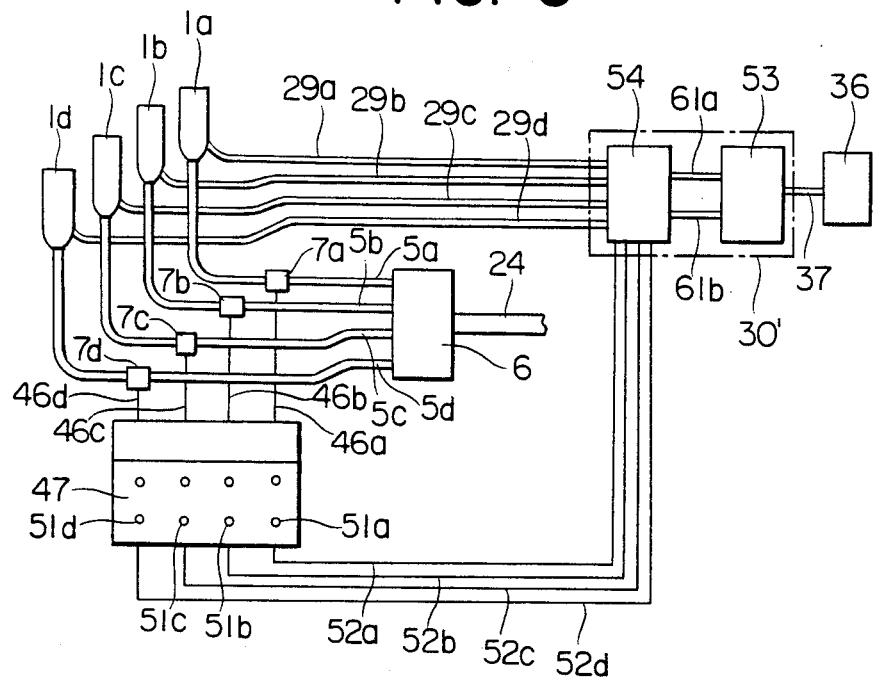
FIG. 8 is a schematic diagram of a second embodiment of the milking apparatus according to the invention.

Deferring to FIGS. 8 and 9, a second embodiment of the milking apparatus according to the invention will be described. Most parts of second embodiment are similar to those of the first embodiment and will now be described by designating at the same reference numerals or characters in FIGS. 8 and 7. The following description will be directed to different parts.

In the second embodiment, an air pressure means 30' is different from the air pressure means 30 of the first embodiment by comprising a pulsating pressure generator 53 and a change-over means 54. The pulsating pressure generator 53, though its details are not illustrated, may be of any type which is connected with a vacuum source 36 to generate periodically and alternately atmospheric pressure and vacuum.

Figure 9:
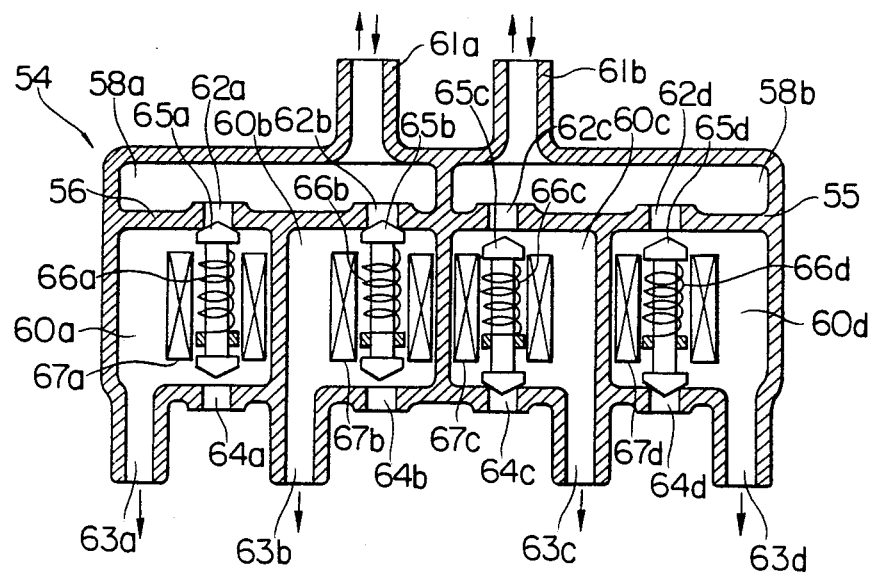
FIG. 9 is a longitudinally sectional front view of a change-over means of pressure means used for the FIG. 8 embodiment, with lefthand two valve bodies being at atmosphere position and righthand two valve bodies being at pulsating pressure position.

The change-over means 54 is detailed in FIG. 9. The change-over means 54 has a housing 55 the interior of which is divided by a partition wall 56 into an intermediate chamber section and a change-over chamber section. The intermediate chamber section is further divided by a partition wall 57 into two intermediate chambers 58a and 58b, and the change-over chamber section is divided by partition walls into four change-over chambers 60a, 60b, 60c and 60d.

The intermediate chamber 58a and 58b are respectively in communication with pressure feed pipes 61a and 61b which are connected to the pulsating pressure generator 53 for alternate generation of atmospheric pressure and vacuum at a constant period. Formed in the partition wall 56 are pressure passages 62a, 62b, 62c and 62d through which the change-over chamber 60a, 60b, and 60d communicate with the intermediate chambers 58a and 58b. The change-over chambers 60a, 60b, 60c and 60d have pressure transfer pipes 63a, 63b, 63c and 63d respectively connected to pressure transmitting tubes 29a, 29b, 29c and 29d, and atmosphere passages 64a, 64b, 64c and 64d opened to atmospheric pressure. The respective atmosphere passages opposes the respective pressure passages 62a, 62b, 62c and 62d.

As in the change-over chamber section of the previous embodiment, there are disposed change-over means comprising valve bodies 65a, 65b, 65c and 65d, springs 66a, 66b, 66c and 66d, and solenoids 67a, 67b, 67c and 67d. The change-over means of the second embodiment operate in a different manner from those of the first embodiment. More particularly, when halt signals are supplied from some or all of the dispatching circuits 50a, 50b, 50c and 50d to the corresponding solenoids (67a and 67b in FIG. 9), these solenoids 67a and 67b are deenergized to open the atmosphere passages 64a and 64b so that, as in the first embodiment, pressure chambers 4 of the corresponding teat cups 1a and 1b are brought into communication with atmospheric pressure. During this period, the remaining solenoids 67c and 67d are not supplied with halt signals to close the atmosphere passages 64c and 64d and open the pressure passages 62c and 62d so that pulsating pressure is continuously applied to the corresponding teat cups 1c and 1d.

Figure 10:
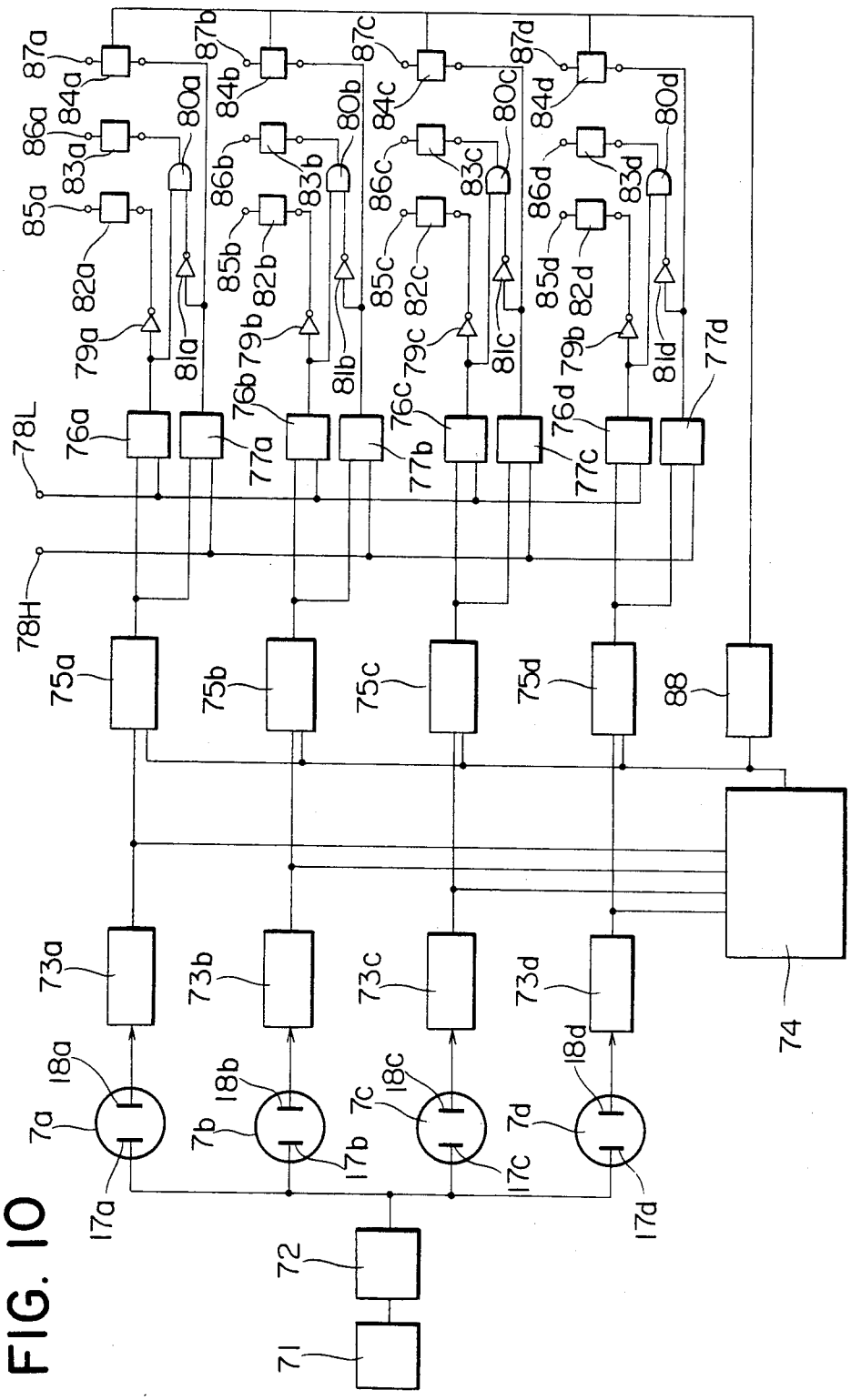
FIG. 10 is a block diagram showing a milk inspection unit combined with the milking apparatus of the invention.
Figure 11:
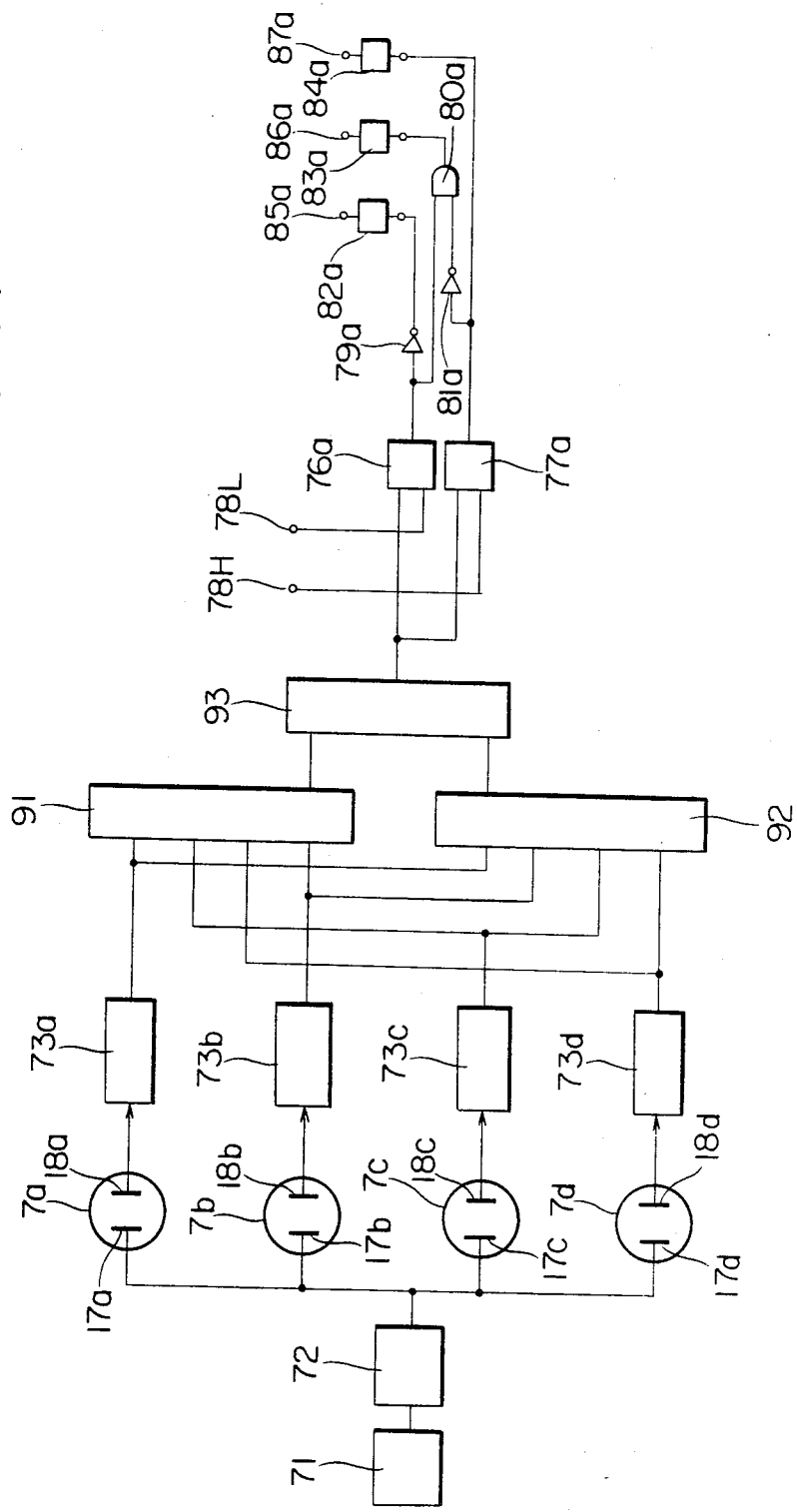
FIG. 11 is a block diagram showing another inspection unit similarly used with the milking apparatus.

Exemplified in FIGS. 10 and 11 are two inspection units of different types which can inspect milk sucked from each teat or all the teats by means of the milking apparatus described in the foregoing to obtain inspection results which can evidence the presence or absence of a cow or cows having mastitis, which teat of a cow has mastitis or how far a cow having mastitis gets ill.

When a milch cow has an illness of udder such as mastitis or milk fever, milk sucked from the diseased cow has an abnormally increased amount of Na and Cl ions and consequently, increased electrical conductivity as well known in the art. This inspection unit utilizes this phenomenon to inspect milk sucked from each teat. Specifically, conductivity of milk sucked from each teat is measured, the difference between the minimum value of conductivity of milk and the other values of conductivity of milk is calculated, and it is determined that a milch cow or a teat flowing milk having a difference value of conductivity which exceeds an abnormal detection reference is diseased. It is determined from the magnitude of the difference value from the reference how far the cow or teat gets ill.

The above inspection unit can be combined with the milking apparatus of the first embodiment as will be described below.

In the inspection unit, a sine wave generating circuit 71 has its output connected to one electrode 17a, 17b, 17c or 17d of respective traps 7a, 7b, 7c and 7d through a buffer amplifier 72. The other electrode 18a, 18b, 18c or 18d of the respective traps is connected to circuits for measuring conductivity 73a, 73b, 73c or 73d.

The output of each of the measuring circuits 73a, 73b, 73c and 73d is connected, on the one hand, to a minimum value selecting circuit 74 and, on the other hand, to one input of respective subtraction circuits 75a, 75b, 75c and 75d with the other input connected to the output of the selecting circuit 74.

The output of each of the subtraction circuits 75a, 75b, 75c and 75d is connected, on the one hand, to one input of respective first comparison circuits 76a, 76b, 76c and 76d and, on the other hand, to one input of respective second comparison circuits 77a, 77b, 77c and 77d. The other input of each of the first comparison circuits is connected to a low level reference value input terminal 78L, and the other input of each of the second comparison circuits is connected to a high level reference value input terminal 78H.

The output of each of the first comparison circuits 76a, 76b, 76c and 76d is connected, on the one hand, to the input of respective NOT circuits 79a, 79b, 79c and 79d and, on the other hand, to one input of respective AND gates 80a, 80b, 80c and 80d.

The output of each of the second comparison circuits 77a, 77b, 77c and 77d is connected, on the one hand, to the input of respective NOT circuits 81a, 81b, 81c and 81d and, on the other hand, to one input of respective third drive circuits 84a, 84b, 84c and 84d.

The output of each of the NOT circuits 79a, 79b, 79c and 79d is connected to the input of respective first drive circuits 82a, 82b, 82c and 82d, and the output of each of the NOT circuits 81a, 81b, 81c and 81d is connected to the other input of the respective AND gates 80a, 80b, 80c and 80d. The AND gates 80a, 80b, 80c and 80d have outputs connected to inputs of second drive circuits 83a, 83b, 83c and 83d.

The first drive circuits 82a to 82d have outputs connected to lamps 85a, 85b, 85c and 85d for indicating normal milk, respectively. The second drive circuits 83a to 83d have outputs connected to lamps 86a, 86b, 86c and 86d for indicating semi-abnormal milk. The third drive circuits 84a to 84d have outputs connected to lamps 87a, 87b, 87c and 87d for indicating abnormal milk.

The minimum value selecting circuit 74 has its output connected to the input of a third comparison circuit 88 set with a reference value for discriminating abnormal milk. The output of the comparison circuit 88 is connected to the other input of each of the third drive circuits 87a to 87d.

The inspection unit of the above construction operates as follows:

The low level input terminal 78L and the high level input terminal 78H are applied with a reference of difference conductivity between teats which is $5 \times 10^{-4}$ S/cm and a reference of difference conductivity of $15\times10^{-4}$ S/cm, respectively, where S (Siemens) represents $\Omega$ (mho).

Milk charged from the respective teat cups shown in FIG. 1 but not shown in FIG. 10 stagnates temporarily within the respective traps 7a, 7b, 7c and 7d.

Since a sine wave signal generated from the generator circuit 71 is applied through the amplifier 72 to one electrode 17a, 17b, 17c or 17d of each of the traps, an AC current is delivered out of the other electrode 18a, 18b, 18c or 18d in accordance with conductivity of milk within each trap. The AC currents are fed to the conductivity measuring circuits 73a, 73b, 73c and 73d and converted thereby into DC output signals indicative of values of conductivity.

The four DC signals are supplied, on the one hand, to the minimum value selecting circuit 74 and, on the other hand, to the one input of the respective subtraction circuits 75a, 75b, 75c and 75d. The selecting circuits 74 selects from its input signals a minimum value and delivers out a minimum value signal which in turn is supplied to the other input of the respective subtraction circuits 75a, 75b, 75c and 75d. The subtractors subtract the minimum value signal from the four DC signals to produce difference signals respectively supplied to the one input of each of the first comparison circuits 76a to 76d and to the one input of each of the second comparison circuits 77a to 77d.

The first comparator compares the difference signal with the low level reference of $5\times10^{-4}$ S/cm and produces a first signal when the difference signal exceeds the low level reference. The second comparator compares the difference signal with the high level reference of $15\times10^{-4}$ S/cm to produce a second signal when the difference signal exceeds the high level reference.

(1) Normal Milk

For normal milk, the first comparator circuit 76a, 76b, 76c and 76d will not deliver the first signals since the difference signal is below the low level reference. Therefore, inverted outputs of the NOT circuit 79a, 79b, 79c and 79d actuate the corresponding first drive circuits 82a, 82b, 82c and 82d, thereby turning on the corresponding normal milk indication lamps 85a, 85b, 85c and 85d.

(2) Semi-abnormal Milk

For semi-abnormal milk, the first comparison circuits will deliver the first signals since the difference signal exceeds the low level reference whereas the second comparison circuits will not deliver the second signals since the difference signal is below the high level reference. Therefore, the first signals and inverted outputs of the NOT circuits 81a, 81b, 81c and 81d enable the corresponding AND gates 80a, 80b, 80c and 80d to actuate the corresponding second drive circuits 83a, 83b, 83c and 83d, thereby turning on the corresponding semi-abnormal indication lamps 86a, 86b, 86c and 86d together with energization of associated buzzers not shown.

(3) Abnormal Milk

For abnormal milk, the first and second comparison circuits will deliver the first and second signals, and the corresponding NOT circuits inhibits the actuation of the first and second drive circuits. Only the third drive circuits 84a, 84b, 84c and 84d are actuated to turn on the corresponding abnormal milk indication lamps 87a, 87b, 87c and 87d together with energization of associated buzzers not shown.

In this manner, milk sucked from each teat is detected to inspect the presence or absence of abnormal teat. But, if all the teats are diseased, then milk from all the teats will have high conductivity without causing the difference in conductivity between milk flows from the respective teats.

In such a case, the abnormal high conductivity can be detected by the third comparison circuit 88. More particularly, a minimum value signal from the minimum value selecting circuit 74 is supplied to the third comparison circuit 88 and compared with an abnormal milk discriminating reference value set therein. When the minimum value signal exceeds the reference value, it is indicated that the milk sucked from all the teats is abnormal. Thus, the comparator 88 delivers an abnormal signal which actuates the third drive circuits 84a, 84b, 84c and 84d, thereby turning on the abnormal milk indication lamps 87a, 87b, 87c and 87d along with energization the associated buzzers.

Even if the milk has the high conductivity without causing the predetermined difference in conductivity between milk flows from the respective teats and the minimum value signal from the circuit 74 does not exceeds the reference value of the comparator 88, the minimum value signal can be detected through the subtraction circuits 75a, 75b, 75c and 75d so that abnormal milk, if exists, can be detected.

FIG. 11 shows another inspection unit. The same parts as those of the FIG. 10 inspection unit are designated by the same reference characters, and the following description will be directed to different parts.

The outputs of conductivity measuring circuits 73a, 73b, 73c and 73d are connected to a maximum value selecting circuit 91 and a minimum value selecting circuit 92. The outputs of the selecting circuits 91 and 92 are subtracted from each other at a subtraction circuit 93.

The difference signal delivered out of the subtraction circuit 93 actuates a drive circuit 82a, 83a or 84a through a first comparator 76a or a second comparator 77a to turn on a corresponding indication lamp along with energization of an associated buzzer.

It will be seen from the foregoing description that the FIG. 11 inspection unit can not detect abnormality of milk from each teat but can detect that any teats are abnormal and consequently identify a cow which is diseased.

The invention has been described in detail sufficient to enable one of ordinary skill in the art to make and use the same. It is believed that certain modifications and alternations of the preferred embodiment will occur to others upon a reading and understanding of the specification, and it is intended to include all such alternations and modifications as part of the invention, insofar as they come within the scope of the appended claims.

What is claimed is:

1. A milking apparatus utilizing teat cups capped on individual teats, said apparatus comprising:
   sets of electrodes for detecting milk flows sucked by each individual teat cup;
   pressure transmitting tubes for transmitting air pressure to pressure chambers of each said respective teat cup;
   air pressure means responsive to actuation of change-over means to supply atmospheric pressure and vacuum periodically and alternately to each said transmitting tube;

counting means for counting times for non-detection of the milk flows by each of said set of electrodes;

control means for actuating said change-over valve means to supply only atmospheric pressure to said transmitting tubes of an individual cup when the counted times of said counting means reach or exceed a predetermined time of said individual cup, said change-over valve means responsive to said air pressure means comprises a valve body for each cup disposed between said transmitting tube and an atmosphere passage as well as a vacuum passage, and a solenoid for selectively moving each said valve body to either an atmosphere position through which said transmitting tube is in communication with said atmosphere passage or a vacuum position through which said transmitting tube is in communication with said vacuum passage, and said control means comprises a counting circuit responsive to an "absence of milk" signal from each of said electrodes to count a duration time of said "absence of milk" signal and deliver an output signal representative of counted time, and a dispatching circuit responsive to the output signal of said counting circuit to compare a received signal with a predetermined time and deliver a halt signal to any solenoid when the received signal from its connected electrodes coincides with or exceeds said predetermined time, whereby said solenoid causes said valve body to halt at said atmosphere position by receiving said halt signal.

2. A milking apparatus according to claim 1 wherein said electrodes are provided for milk feeding pipes connected to said teat cups.

3. A milking apparatus according to claim 1 wherein said electrodes are provided for partition chambers of milk-claws connected to milk feed pipes, respectively.

4. A milking apparatus according to any one of claims 1, 2 or 3, wherein said electrodes are used in common the electrodes for measuring the electric conductivity for the milk flowed in inspection means for milk.

* * * * *